United States Patent
Miyahara et al.

(10) Patent No.: US 10,538,629 B2
(45) Date of Patent: *Jan. 21, 2020

(54) DEVICE FOR CONTINUOUSLY PRODUCING POLY(ARYLENE SULFIDE) AND METHOD FOR CONTINUOUSLY PRODUCING POLY(ARYLENE SULFIDE)

(71) Applicant: Kureha Corporation, Tokyo (JP)

(72) Inventors: Michihisa Miyahara, Tokyo (JP); Kenji Suzuki, Tokyo (JP); Hiroshi Sakabe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/089,407

(22) PCT Filed: Feb. 28, 2017

(86) PCT No.: PCT/JP2017/007863
§ 371 (c)(1),
(2) Date: Sep. 28, 2018

(87) PCT Pub. No.: WO2017/179327
PCT Pub. Date: Oct. 19, 2017

(65) Prior Publication Data
US 2019/0112426 A1    Apr. 18, 2019

(30) Foreign Application Priority Data
Apr. 13, 2016   (JP) .................................. 2016-080419

(51) Int. Cl.
*C08G 75/0259* (2016.01)
*C08G 75/02* (2016.01)
(Continued)

(52) U.S. Cl.
CPC .......... *C08G 75/0259* (2013.01); *B01J 4/008* (2013.01); *B01J 19/006* (2013.01);
(Continued)

(58) Field of Classification Search
CPC ........................... C08G 75/02; C08G 75/0259
(Continued)

(56) References Cited

U.S. PATENT DOCUMENTS 4,056,515 A   11/1977  Vidaurri, Jr.
4,060,520 A   11/1977  Irvin
(Continued)

FOREIGN PATENT DOCUMENTS

CN    104447480 A    3/2015
CN    109923153      6/2019
(Continued)

OTHER PUBLICATIONS

U.S. Appl. No. 16/099,284 claims (Year: 2018).*
(Continued)

*Primary Examiner* — Duc Truong
(74) *Attorney, Agent, or Firm* — Abel Schillinger, LLP

(57) ABSTRACT

Provided are a device for continuously producing poly (arylene sulfide) (hereinafter, referred to as PAS) and a method for continuous PAS production with which resource savings, energy savings, and a reduction in equipment cost are rendered possible. The device for continuous PAS production according to the present invention includes a housing chamber for housing a plurality of reaction cells; wherein the housing chamber is supplied with at least an organic amide solvent, a sulfur source, and a dihalo aromatic compound. In the reaction cells, the sulfur source is polymerized with the dihalo aromatic compound in the organic amide solvent to form a reaction mixture. The reaction cells communicate with each other through a gas phase within the
(Continued)

housing chamber. The reaction cells are sequentially connected, and the reaction mixture sequentially moves to each reaction cell.

6 Claims, 2 Drawing Sheets

(51) Int. Cl.
| | | |
|---|---|---|
| *B01J 19/00* | (2006.01) | |
| *B01J 4/00* | (2006.01) | |
| *B01J 19/06* | (2006.01) | |
| *B01J 19/24* | (2006.01) | |
| *C08G 75/0213* | (2016.01) | |
| *C08F 2/01* | (2006.01) | |

(52) U.S. Cl.
CPC ........... *B01J 19/0066* (2013.01); *B01J 19/06* (2013.01); *B01J 19/245* (2013.01); *C08G 75/02* (2013.01); *C08G 75/0213* (2013.01); *B01J 2219/00033* (2013.01); *B01J 2219/0077* (2013.01); *B01J 2219/00768* (2013.01); *B01J 2219/00779* (2013.01); *B01J 2219/187* (2013.01); *B01J 2219/24* (2013.01)

(58) Field of Classification Search
USPC ........................................................ 528/387
See application file for complete search history.

(56) References Cited

U.S. PATENT DOCUMENTS

| | | | |
|---|---|---|---|
| 4,066,632 | A | 1/1978 | Anderson et al. |
| 4,301,275 | A | 11/1981 | Heinze et al. |
| 4,370,470 | A | 1/1983 | Vidaurri et al. |
| 6,538,102 | B1 | 3/2003 | Haubs et al. |
| 2015/0087776 | A1 | 3/2015 | Chiong et al. |
| 2019/0112426 | A1 | 4/2019 | Miyahara et al. |

FOREIGN PATENT DOCUMENTS

| | | |
|---|---|---|
| EP | 3514197 A1 | 7/2019 |
| JP | S45-003368 B1 | 2/1970 |
| JP | 51-137786 A | 11/1976 |
| JP | 61-136523 A | 6/1986 |
| JP | S62-126231 U1 | 8/1987 |
| JP | H0827264 A | 1/1996 |
| JP | H0871395 A | 3/1996 |
| JP | H08-100064 A | 4/1996 |
| JP | H0987392 A | 3/1997 |
| JP | H09169843 A | 6/1997 |
| JP | H09169844 A | 6/1997 |
| JP | 2002-039462 A | 2/2002 |
| JP | 2002-505361 A | 2/2002 |
| JP | 2002-121271 A | 4/2002 |
| JP | 2002-220466 A | 8/2002 |
| JP | 2008161848 A | 7/2008 |
| JP | 2008-285565 A | 11/2008 |
| JP | 2008-285596 A | 11/2008 |
| JP | 2012-188625 A | 10/2012 |
| JP | 2016-532770 A | 10/2016 |
| JP | 64-73277 B2 | 2/2019 |
| KR | 20190041971 | 4/2019 |
| WO | 2015/047718 A1 | 4/2015 |
| WO | 2017/179327 A1 | 10/2017 |
| WO | 2018/159222 A1 | 9/2018 |
| WO | 2019/074052 A1 | 4/2019 |

OTHER PUBLICATIONS

U.S. Appl. No. 16/314,496 claims (Year: 2018).*
Translation of the International Preliminary Report on Patentability for PCT/JP2017/007863 dated Oct. 25, 2018.
First Office Action and translation of the First Office Action of the Japanese Patent Office for JP2018-511922/PCT/JP2017/007863 with dispatch date of Sep. 11, 2018.
Translation of the International Search Report for PCT/JP2017/007863 dated Apr. 25, 2017.
First Office Action of the Korean Intellectual Property Office for KR10-2018-7025713/PCT/JP2017/007863 dated Dec. 13, 2018.
Translation of the First Office Action of the Korean Intellectual Property Office for KR10-2018-7025713/PCT/JP2017/007863 dated Dec. 13, 2018.
International Search Report from Application No. PCT/JP2018/003805 dated Mar. 27, 2018, 9 pgs.
Office Action from CN Application No. 201780015506.1 dated Mar. 13, 2019, 12 pgs.
International Search Report from Application No. PCT/JP2018/037913 dated Dec. 25, 2018, 9 pgs.
Office Action from JP Application No. 2018-544945 dated Oct. 16, 2018, 6 pgs.
Extended European Search Report from EP Application No. 18819253.8 dated Oct. 14, 2019, 7 pgs.
Office Action from CN Application No. 201780015506.1 dated Nov. 5, 2019, 8 pgs, with full English-language translation. (Previously cited Dec. 4, 2019, not attached herewith).
Office Action from JP Application No. 2018-558368 dated Nov. 19, 2019, 7 pgs, with full English-language translation, (Previously cited Dec. 4, 2019, not attached herewith).
DJK Corporation, ""Synthesis of polycondensation polymer"", made public on Jun. 29, 2017 at the latest, https://web.archive,org/web/20170629061645/https://www.djklab.com/parts/support/pdf/33.jyuushukugou.pdf, 6 pgs, with English-language Machine Translation. (Previously cited Dec. 4, 2019, not attached herewith).
Office Action from CN Application No. 201780015506.1 dated Nov. 5, 2019, 8 pgs, with full English-language translation.
Office Action from JP Application No. 2018-558368 dated Nov. 19, 2019, 7 pgs, with full English-language translation.
DJK Corporation, ""Synthesis of polycondensation polymer"", made public on Jun. 29, 2017 at the latest, https://web.archive.org/web/20170629061645/https://www.djklab.com/parts/support/pdf/33.jyuushukugou.pdf, 6 pgs, with English-language Machine Translation.

* cited by examiner

DEVICE FOR CONTINUOUSLY PRODUCING POLY(ARYLENE SULFIDE) AND METHOD FOR CONTINUOUSLY PRODUCING POLY(ARYLENE SULFIDE)

TECHNICAL FIELD

The present invention pertains to a device for continuously producing poly(arylene sulfide) and a method for continuously producing poly(arylene sulfide).

BACKGROUND ART

Poly(arylene sulfides) (hereinafter, also referred to as "PAS"), represented by polyphenylene sulfide (hereinafter, also referred to as "PPS"), are engineering plastics having excellent heat resistance, chemical resistance, flame retardancy, mechanical strength, electrical characteristics, dimensional stability, and the like. PAS can be formed into various molded products, films, sheets, fibers, and the like by general melting processing methods such as extrusion molding, injection molding and compression molding, and therefore PAS is widely used in an extensive range of technical fields including those of electrical instruments, electronic instruments, automobile instruments and packaging materials.

Examples of methods for producing PAS include methods that use batch systems, but a method which uses a continuous system has also been proposed. For example, Patent Documents 1 to 3 disclose PAS continuous polymerization devices in which pressure resistant polymerization vessels are connected in series, and the reaction solution is transferred between the polymerization vessels by a pressure difference, and also methods for continuously polymerizing PAS using the devices thereof.

CITATION LIST

Patent Literature

Patent Document 1: U.S. Pat. No. 4,056,515, Specification
Patent Document 2: U.S. Pat. No. 4,060,520, Specification
Patent Document 3: U.S. Pat. No. 4,066,632, Specification

SUMMARY OF INVENTION

Technical Problem

With known PAS continuous production devices, a plurality of pressure resistant polymerization vessels, piping between these polymerization vessels, transfer equipment, instrumentation devices, and the like are necessary, and a large amount of energy is needed to drive the above-mentioned devices, and therefore it is difficult to achieve resource savings, energy savings, a reduction in equipment costs, and the like The present invention was achieved in light of the above-mentioned issues, and an object thereof is to provide a device for continuous PAS production and a method for continuous PAS production, with which resource savings, energy savings, and a reduction in equipment costs are rendered possible.

Solution to Problem

The present inventors discovered that the above-mentioned issues can be solved through a specific PAS continuous production device provided with a housing chamber for housing a plurality of sequentially connected reaction cells, and thereby arrived at the completion of the present invention.

According to a first aspect of the present invention, a device for continuously producing poly(arylene sulfide) (PAS) is provided, the device including a housing chamber configured to house a plurality of reaction cells, the housing chamber being supplied with at least: an organic amide solvent; at least one type of sulfur source selected from the group consisting of hydrogen sulfide, alkali metal sulfides, and alkali metal hydrosulfides; and a dihalo aromatic compound; a reaction mixture being formed by carrying out a polymerization reaction between the sulfur source and the dihalo aromatic compound in the organic amide solvent in at least one or more reaction cells, the reaction cells being mutually communicated through a gas phase within the housing chamber, and the reaction cells being sequentially connected, and the reaction mixture being sequentially moved to each of the reaction cells.

According to a second aspect of the present invention, provided is a method for continuously producing poly(arylene sulfide) (PAS) by carrying out simultaneously the steps of: supplying at least: an organic amide solvent; at least one type of sulfur source selected from the group consisting of hydrogen sulfide, alkali metal sulfides, and alkali metal hydrosulfides; and a dihalo aromatic compound to a housing chamber inside a device for continuously producing poly(arylene sulfide), the device including the housing chamber configured to house a plurality of sequentially connected reaction cells; forming a reaction mixture by carrying out a polymerization reaction between the sulfur source and the dihalo aromatic compound in the organic amide solvent in at least one or more reaction cells; removing from the housing chamber at least a portion of the water inside the housing chamber through a gas phase in the housing chamber; and sequentially moving the reaction mixture to each of the reaction cells.

Advantageous Effects of Invention

According to the present invention, a PAS continuous production device and PAS continuous production method that enable resource savings, energy savings, and a reduction in equipment costs can be provided.

DESCRIPTION OF EMBODIMENTS

Embodiments of the present invention will be described in detail hereinafter, but the present invention is not limited to these embodiments.

Embodiment 1

Figure 1:
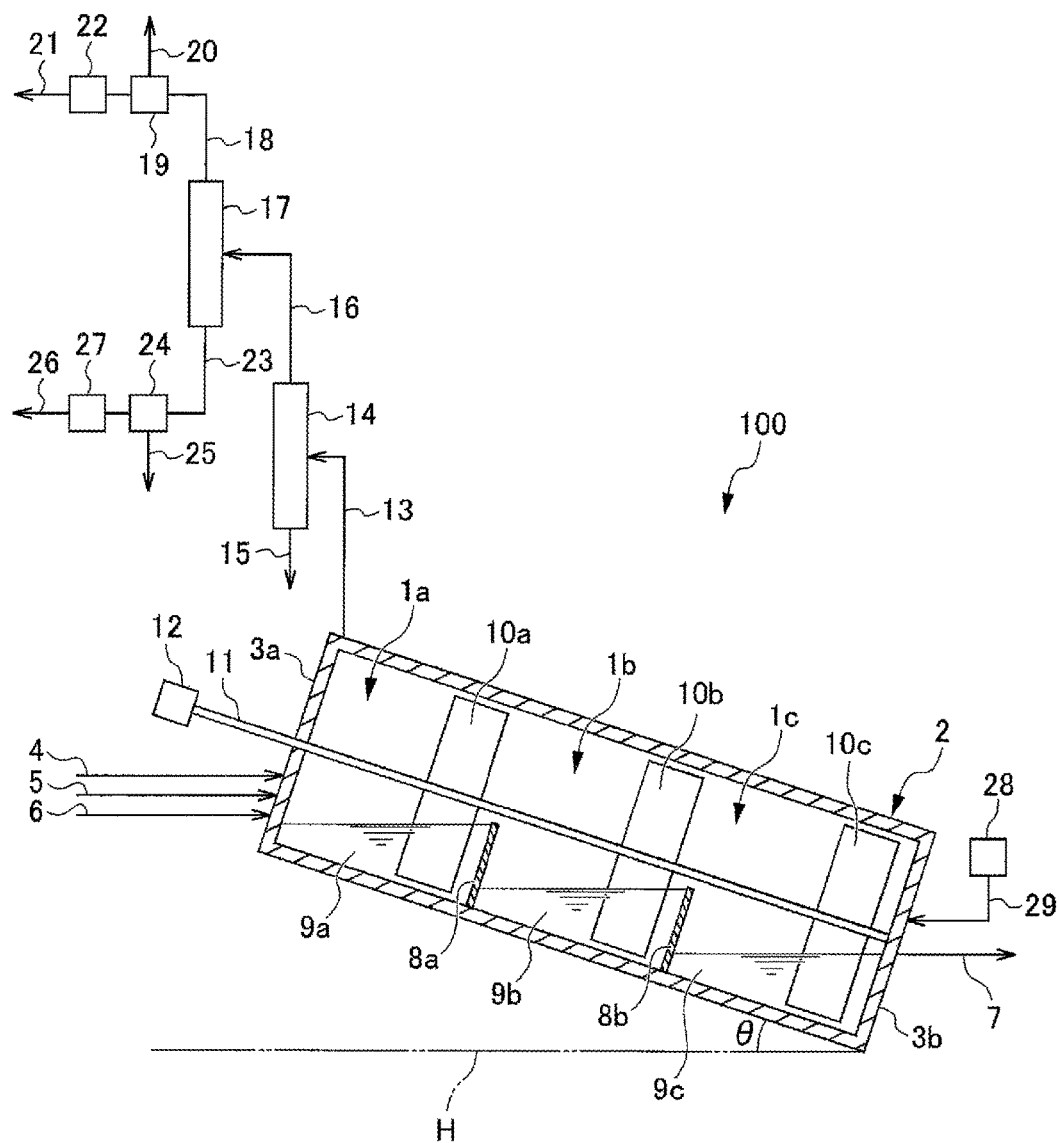
FIG. 1 is a partial cross-sectional view illustrating one embodiment of a PAS continuous production device according to the present invention.

FIG. 1 is a partial cross-sectional view illustrating one embodiment (hereinafter, referred to as "Embodiment 1") of a PAS continuous production device according to the present invention. The configuration of Embodiment 1 is described below based on FIG. 1.

A PAS continuous production device 100 according to Embodiment 1 includes a housing chamber 2 for housing reaction cells 1a, 1b, and 1c. In the PAS continuous production device 100, the housing chamber 2 is installed at an incline so as to form an angle θ relative to a horizontal plane H. The shape of the housing chamber 2 is not particularly limited, and examples include a hollow cylindrical shape or a hollow prismatic shape for which a side wall 3a contacting the reaction cell 1a and a side wall 3b contacting the reaction cell 1c are used as bottom surfaces.

An organic amide solvent supply line 4 for supplying the organic amide solvent to the housing chamber 2, a sulfur source supply line 5 for supplying at least one type of sulfur source selected from the group consisting of hydrogen sulfide, alkali metal sulfides, and alkali metal hydrosulfides to the housing chamber 2, and a dihalo aromatic compound supply line 6 for supplying a dihalo aromatic compound to the housing chamber 2 are connected to the side wall 3a of the housing chamber 2. As necessary, a water supply line for supplying water to the housing chamber 2 may be connected. A reaction mixture recovery line 7 for recovering the reaction mixture from the housing chamber 2 is connected to the side wall 3b of the housing chamber 2. The organic amide solvent, sulfur source, and dihalo aromatic compound may be supplied through a gas phase to a liquid phase of the reaction cell 1a, or may be supplied directly to the liquid phase of the reaction cell 1a.

The reaction cell 1a and the reaction cell 1b are partitioned by a partition wall 8a, and the reaction cell 1b and the reaction cell 1c are partitioned by a partition wall 8b. The reaction cells 1a, 1b, and 1c are mutually communicated through the gas phase in the housing chamber 2. As a result, the pressure of the gas phase in the housing chamber 2 becomes uniform. Since the housing chamber 2 is installed at an incline so as to form the angle θ relative to the horizontal plane H, a maximum liquid surface level of a liquid that can be stored becomes higher in the order of the reaction cell 1a, the reaction cell 1b, and the reaction cell 1c. The reaction cells 1a, 1b, and 1c are connected in series in the above-mentioned order. Note that with respect to each reaction cell with the exception of the furthest upstream reaction cell 1a in the direction of movement of the reaction mixture, the minimum height of the upstream side partition wall in the movement direction is higher than the maximum liquid surface level of the reaction cell. That is, with respect to the reaction cell 1b, the minimum height of the upstream side partition wall 8a in the movement direction is higher than the maximum liquid surface level of the reaction cell 1b, and with respect to the reaction cell 1c, the minimum height of the upstream side partition wall 8b in the movement direction is higher than the maximum liquid surface level of the reaction cell 1c. Such a configuration prevents reverse flow from the reaction cell 1b to the reaction cell 1a, and reverse flow from the reaction cell 1c to the reaction cell 1b. The reaction cells 1a, 1b, and 1c respectively accommodate reaction mixtures 9a, 9b, and 9c.

In this manner, with respect to a preferable embodiment of the PAS continuous production device according to the present invention, the reaction cells may be configured so that at least one group or more with regard to combinations of adjacent reaction cells are connected in order from the highest maximum liquid surface level of liquid that can be accommodated by the reaction cells; and the reaction mixture is moved by the difference in heights of the maximum liquid surface levels from a reaction cell with a higher maximum liquid surface level to a reaction cell with a lower maximum liquid surface level.

According to this configuration, the reaction mixture moves in accordance with the difference in liquid surface levels and gravitational force, and therefore there is no need to provide a separate means for causing the reaction mixture to move to the next reaction cell.

In the housing chamber 2, a stirring blade 10a for stirring the reaction mixture 9a in the reaction cell 1a, a stirring blade 10b for stirring the reaction mixture 9b in the reaction cell 1b, and a stirring blade 10c for stirring the reaction mixture 9c in the reaction cell 1c are installed on the same stirring shaft 11. The stirring shaft 11 is installed so as to pierce through the side wall 3a from outside the housing chamber 2 and extend to reach the side wall 3b. A rotational driving device 12 for rotating the stirring shaft 11 is installed at the end of the stirring shaft 11 on the side wall 3a side.

One end of an exhaust line 13 is connected near the side wall 3a of the housing chamber 2. A dehydration unit 14 for removing water from the gas phase in the housing chamber 2 is connected to the other end of the exhaust line 13. The dehydration unit 14 communicates with the gas phase in the housing chamber 2 through the exhaust line 13. An organic amide solvent recovery line 15 is connected to one end (for example, a bottom part) of the dehydration unit 14. One end of a vapor recovery line 16 is connected to the other end (for example, a top part) of the dehydration unit 14. A gas-liquid separation unit 17 is connected to the other end of the vapor recovery line 16. A reaction raw material separation and recovery unit 19 is connected to the other end of a gas recovery line 18 that is branched from one end (for example, a top part) of the gas-liquid separation unit 17. A waste gas line 20 and a reaction raw material resupply line 21 branch from the reaction raw material separation and recovery unit 19, and a reaction raw material resupply unit 22 for resupplying at least a portion of the reaction raw materials separated and recovered by the reaction raw material separation and recovery unit 19 to at least some of the reaction cells 1a to 1c is connected to the reaction raw material resupply line 21. Meanwhile, a reaction raw material separation and recovery unit 24 is connected to the other end of a liquid recovery line 23 that is branched from the other end (for example, a bottom part) of the gas-liquid separation unit 17. A wastewater line 25 and a reaction raw material resupply line 26 branch from the reaction raw material separation and recovery unit 24, and a reaction raw material resupply unit 27 for resupplying at least a portion of the reaction raw materials separated and recovered by the reaction raw material separation and recovery unit 24 to at least some of the reaction cells 1a to 1c is connected to the reaction raw material resupply line 26. At least a portion of the reaction raw materials may be supplied to the liquid phase of at least some of the reaction cells 1a to 1c through the gas phase, or may be supplied directly to the liquid phase of at least some of the reaction cells 1a to 1c.

A gas feeding unit 28 that communicates with the gas phase in the housing chamber 2 to feed inert gas to the gas phase from a downstream side to an upstream side in the movement direction of the reaction mixture, namely, from the reaction cell 1c towards the reaction cell 1a, is connected through a gas feeding line 29 to the side wall 3b of the housing chamber 2. The inert gas is not particularly limited, and examples include argon and other noble gases; and nitrogen.

Next, the operation of Embodiment 1 is described below based on FIG. 1.

The organic amide solvent, the at least one type of sulfur source selected from the group consisting of hydrogen sulfide, alkali metal sulfides, and alkali metal hydrosulfides, and the dihalo aromatic compound are supplied to the housing chamber 2 through the respective organic amide solvent supply line 4, sulfur source supply line 5, and dihalo aromatic compound supply line 6. Note that a portion or all of the raw material may be premixed and then supplied to the housing chamber 2. For example, a mixture of the organic amide solvent and the dihalo aromatic compound may be prepared in advance, and this mixture may then be supplied to the housing chamber 2. In this case, for example, in place of the organic amide solvent supply line 4 and the dihalo aromatic compound supply line 6, a mixture supply line 4a (not illustrated) can be connected to the side wall 3a, and the mixture can then be supplied to the housing chamber 2 through the mixture supply line 4a. In addition, a mixture of the organic amide solvent and the sulfur source may be prepared in advance, and this mixture may then be supplied to the housing chamber 2. For example, an organic amide solvent, and sodium sulfide or sodium hydrosulfide may be reacted to form a complex (SMAB-NaSH) containing sodium aminobutyrate (SMAB) and/or sodium hydrosulfide (NaSH), and the complex may then be supplied. In a case in which this mixture contains water, the mixture may be used after removing at least a portion of the water.

The supplied organic amide solvent, sulfur source, and dihalo aromatic compound are mixed in the reaction cell 1a, a polymerization reaction between the sulfur source and the dihalo aromatic compound is carried out in the organic amide solvent, and thereby the reaction mixture 9a is formed.

Materials ordinarily used in the production of PAS can be used for the organic amide solvent, the at least one type of sulfur source selected from the group consisting of hydrogen sulfide, alkali metal sulfides and alkali metal hydrosulfides, and the dihalo aromatic compounds. Examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-diallyl-2-imidazolidinone; tetraalkyl urea compounds, such as tetramethyl urea; and hexaalkylphosphate triamide compounds, such as hexamethyl phosphate triamide.

Examples of the sulfur source include alkali metal sulfides, alkali metal hydrosulfides, and hydrogen sulfide, and the sulfur source is preferably an alkali metal sulfide or an alkali metal hydrosulfide from the perspective of handling ease. The sulfur source can be used, for example, in a state of an aqueous slurry or an aqueous solution, and is preferably in the state of an aqueous solution from the perspective of handling ease such as weighing ease and transporting ease and so on.

Examples of the alkali metal sulfides include lithium sulfide, sodium sulfide, potassium sulfide, rubidium sulfide, and cesium sulfide.

Examples of the alkali metal hydrosulfides include lithium hydrosulfide, sodium hydrosulfide, potassium hydrosulfide, rubidium hydrosulfide, and cesium hydrosulfide.

Examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. A halogen atom indicates an atom of fluorine, chlorine, bromine, and iodine, and the two halogen atoms in the dihalo aromatic compound may be the same or different.

Furthermore, to produce a branched or crosslinked polymer, a polyhalo compound (not necessarily an aromatic compound) in which three or more halogen atoms are bonded, an active hydrogen-containing halogenated aromatic compound, a halogenated aromatic nitro compound, or the like may be used in combination. A preferable example of the polyhalo compound as a branching/crosslinking agent is trihalobenzene.

These compounds can be used at an amount of approximately from 0.01 to 5 mol % with respect to the dihalo aromatic compound.

A polymerization aid having an action of increasing the molecular weight of the polymer that is obtained can be used, as necessary, in the present invention.

Specific examples of this type of polymerization aid include, for example, organic carboxylates, organic sulfonates, sulfuric acid alkali metal salts, alkali earth metal oxides, alkali metal phosphates, and alkali earth metal phosphates. These can be used alone or two or more types can be simultaneously used. Of these, organic carboxylates are preferably used. More specific examples include lithium acetate, sodium acetate, potassium acetate, sodium propionate, lithium benzoate, sodium benzoate, sodium phenyl acetate, and sodium p-tolulate. These organic carboxylates can be used alone or two or more types can be simultaneously used. Of these, lithium acetate and/or sodium acetate is preferably used, and sodium acetate is more preferably used because it is inexpensive and can be easily procured.

These materials may be used alone or may be used by mixing two or more types as long as the combination can produce the PAS.

Note that, for example, in a case in which the reaction raw materials that are to be supplied to the housing chamber 2 are mostly in an anhydrous state, water may be added to at least some of the reaction cells 1a to 1c in order to promote a reaction.

PAS having a weight average molecular weight of 2000 or greater, preferably 5000 or greater, and particularly preferably 6000 or greater, and 300000 or less, and preferably 100000 or less can be obtained by carrying out the polymerization reaction at from 170 to 290° C. until the conversion ratio of the dihalo aromatic compound becomes 50% or greater.

A first-stage polymerization reaction between the sulfur source and the dihalo aromatic compound is also one preferable aspect. The first-stage polymerization reaction is achieved by initiating a polymerization reaction by heating the mixture, and produces a prepolymer having a dihalo aromatic compound conversion ratio of 50% or greater.

In the first-stage polymerization reaction, preferably, a polymerization reaction is initiated by heating at a temperature from 170 to 270° C., and a prepolymer having a dihalo aromatic compound conversion ratio of 50% or greater is produced. From the perspective of suppressing side reactions and/or decomposition reactions, the polymerization temperature in the first-stage polymerization reaction is preferably selected from a range from 180 to 265° C.

The dihalo aromatic compound conversion ratio is preferably from 50 to 98%, more preferably from 60 to 97%, even more preferably from 65 to 96%, and particularly preferably from 70 to 95%. The conversion ratio of the dihalo aromatic compound can be calculated by using gas chromatography to determine the amount of the dihalo aromatic compound remaining in the reaction mixture and then performing a calculation based on the remaining amount of the dihalo aromatic compound, the charged amount of the dihalo aromatic compound, and the charged amount of the sulfur source.

The weight average molecular weight of the prepolymer is 2000 or greater, preferably 5000 or greater, and particularly preferably 6000 or greater, and is 10000 or less, and preferably 9000 or less.

When the height of the reaction mixture 9a exceeds the maximum liquid surface level of the reaction cell 1a, the reaction mixture 9a passes over the partition wall 8a, and flows into the reaction cell 1b. At the reaction cell 1b, similar to the reaction cell 1a, a polymerization reaction between the sulfur source and the dihalo aromatic compound is carried out in the organic amide solvent, and thereby the reaction mixture 9b is formed. Furthermore, when the height of the reaction mixture 9b exceeds the maximum liquid surface level of the reaction cell 1b, the reaction mixture 9b passes over the partition wall 8b, and flows into the reaction cell 1c. At the reaction cell 1c, similar to the reaction cells 1a and 1b, a polymerization reaction between the sulfur source and the dihalo aromatic compound is carried out in the organic amide solvent, and thereby the reaction mixture 9c is formed. Lastly, when the height of the reaction mixture 9c exceeds the maximum liquid surface level of the reaction cell 1c, the reaction mixture 9c is recovered through the reaction mixture recovery line 7. The recovered reaction mixture 9c can be subjected, as appropriate, to a refining operation and/or an additional polymerization reaction, and the like to obtain PAS or a PAS prepolymer. Note that the maximum liquid surface level of the reaction cell 1c is determined, for example, based on the connection position of the reaction mixture recovery line 7 at the side wall 3b. In this manner, through a difference in heights of the maximum liquid surface levels in the reaction cells 1a to 1c, the reaction mixture moves sequentially in the order of the reaction cells 1a, 1b, and 1c from a reaction cell with a higher maximum liquid surface level to a reaction cell with a lower maximum liquid surface level. Note that when the reaction mixture 9a and the reaction mixture 9b exceed the maximum liquid surface level, the reaction mixtures thereof can pass over the respective partition walls 8a and 8b, and as long as mutual communication of the reaction cells 1a, 1b, and 1c through the gas phase in the housing chamber 2 is not obstructed, the shapes of the partition walls 8a and 8b are not particularly limited, and may be any optional shape. Moreover, the reaction solution may move through an opening such as a penetrating opening or a slit (neither is illustrated) in the partition wall.

By the action of the dehydration unit 14 (described in detail below) through the exhaust line 13, at least some of the water in the housing chamber 2 is removed from the housing chamber 2 through the gas phase in the housing chamber 2. Water in the housing chamber 2 includes, for example, water supplied to the housing chamber 2 and water produced in the polymerization reaction. Here, the water supplied to the housing chamber 2 indicates, for example, water that is actively supplied to the housing chamber 2, and, for a case in which water is not actively supplied to the housing chamber 2, water that is ordinarily supplied to the housing chamber 2 along with reaction raw materials in a state of being contained in the reaction raw materials. The vapor pressure of water is high, and therefore when the gas phase of the housing chamber 2 contains a large amount of moisture, the inside of the housing chamber 2 easily becomes a high pressure state, and pressure resistance of the housing chamber 2 becomes necessary, making it difficult to achieve resource savings, reductions in equipment costs, and the like. However, resource savings, reductions in equipment costs, and the like can be effectively achieved by removing water through the dehydration unit 14 to thereby lower the pressure in the housing chamber 2. The pressure inside the housing chamber 2 can be lowered, for example, to approximately from 0.2 to 0.3 MPa, and preferably approximately 0.04 MPa.

The reaction cells 1a to 1c are mutually communicated through the gas phase in the housing chamber 2, and the pressure of the gas phase in the housing chamber 2 is uniform, and therefore water is equally removed from all of the reaction cells 1a to 1c by the dehydration unit 14. Thus, the amount of water in the reaction mixture decreases as it moves from the reaction cell 1a towards the reaction cell 1c, or in other words, from the upstream side towards the downstream side in the movement direction of the reaction mixture. As a result, inhibition of the reaction by water is suppressed, and the polymerization reaction is promoted. Furthermore, the boiling point of the reaction mixture is increased, and therefore polymerization at high temperatures becomes possible, and the polymerization reaction can be promoted. Moreover, through the above-described promotion of the polymerization reaction, the temperature of the reaction mixture is easily increased, and the polymerization reaction is easily promoted. As described above, the PAS continuous production device 100, for example, may include means for increasing the temperature of the reaction cells 1a to 1c from the upstream side towards the downstream side in the movement direction through an overall configuration of arranging each part as described above, and carrying out a continuous reaction.

The gas feeding unit 28 feeds inert gas to the gas phase in the housing chamber 2 from the downstream side towards the upstream side in the direction of movement of the reaction mixture, namely, from the reaction cell 1c towards the reaction cell 1a. As described above, to maintain a state in which the amount of water in the reaction mixture decreases from the upstream side towards the downstream side in the direction of movement of the reaction mixture, preferably, the configuration is such that moisture evaporated from the reaction mixture does not flow to the above-mentioned downstream side and condense above the reaction mixture. The water vapor can be effectively prevented from flowing to the downstream side and condensing above the reaction mixture by feeding inert gas to the above-mentioned gas phase in the manner described above using the gas feeding unit 28.

The flow rate of the inert gas is not particularly limited as long as it is within a range that inhibits the flow of water vapor to the downstream side. For example, for a case in which the housing chamber 2 has a hollow cylindrical shape which has an inner radius r and includes the side wall 3a and the side wall 3b as the bottom surface, when the flow rate of the inert gas is represented by u, and the volumetric flow rate of the inert gas is represented by F, then the flow rate of the inert gas is expressed by $u=F/(\pi r^2)$. Here, in a case in which the water vapor does not easily flow to the downstream side, Taylor dispersion holds true, that is, when consideration is given to the change from molecular diffusion domination to convection diffusion domination, as a condition for Taylor dispersion to hold true, the inequality equation $r \cdot u \gg D$ (wherein, D is the diffusion coefficient of water vapor) holds true. From the above, the flow rate of the inert gas is a value that is within a range such that, for example, $F \gg D \cdot \pi r$, more specifically, F>10D·πr, preferably F>25D·πr, and more preferably F>50D·πr hold true. Note that for a case in which the housing chamber 2 has a hollow prismatic shape including the side wall 3a and the side wall 3b as the bottom surfaces, and the cross section perpendicular to the direction of movement of the reaction mixture has any optional shape, a representative length in the direction perpendicular to the direction of movement of the reaction mixture, for example, the circular equivalent radius of the cross-section, which has any optional shape, is used as r, and can be applied in the above-mentioned equations.

The stirring shaft 11 is rotated by the rotational driving device 12, and in association therewith, the stirring blades 10a to 10c installed on the stirring shaft 11 rotate around the stirring shaft 11, and stir the reaction mixtures 9a to 9c. The stirring blades 10a to 10c are installed on the same stirring shaft 11, and therefore all of the stirring blades 10a to 10c rotate under the same conditions by merely rotating the stirring shaft 11 using the rotational driving device 12, and thus homogeneous stirring can be achieved with high efficiency. As the above-mentioned polymerization reaction advances, NaCl and other alkali metal halides are deposited and accumulated in the reaction cells 1a to 1c. As a result, for example, accumulation of the NaCl and other alkali metal halides tends to cause reduction in the volume sufficient for advancing polymerization reactions in the reaction cells 1a to 1c and decrease in productivity and the like, and therefore excessive maintenance operations to remove the accumulated alkali metal halides needs to be performed. However, by stirring the reaction mixtures 9a to 9c through the stirring blades 10a to 10c, the alkali metal halides are easily dispersed in the reaction mixtures 9a to 9c, moved to the above-mentioned downstream side, and discharged to outside the housing chamber 2. On the other hand, when the stirring is too intense, the reaction mixture flows over the partition wall 8a and/or the partition wall 8b, and is unnecessarily mixed into a downstream side reaction cell from an upstream side reaction cell. Preferably, the stirring blade shape, quantity, rotational speed, and the like are adjusted, as appropriate, so that dispersion of alkali metal halides can be promoted, and unnecessary mixing of reaction mixtures between reaction cells can be avoided. Of these, the rotational speed of the stirring blades is, for example, set as a condition such that the alkali metal halides do not precipitate, and more specifically, the rotational speed is set so that the stirring speed by the stirring blades is at or above the particle floating limit stirring speed. Note that from the perspective of easily preventing the reaction mixture from flowing over the partition wall 8a and/or the partition wall 8b, the upper limit of the rotational speed at the tip end of a stirring blade is preferably such that the rotational speed of the stirring blades becomes 60 rpm or less and more preferably 20.5 rpm or less. Moreover, the rotational path and the like of the stirring blades are also preferably adjusted, as appropriate, so that stirring is sufficiently performed. For example, preferably, the stirring blades pass through at least a portion which is deeper than each average depth of the reaction cells 1a to 1c. In particular, the sizes of the gap between the stirring blade 10a and the bottom part of the reaction cell 1a, the gap between the stirring blade 10a and the partition wall 8a, the gap between the stirring blade 10b and the bottom part of the reaction cell 1b, the gap between the stirring blade 10b and the partition wall 8b, the gap between the stirring blade 10c and the bottom part of the reaction cell 1c, and the gap between the stirring blade 10c and the side wall 3b are preferably made small so that stirring is sufficiently implemented in the vicinity of each of the deepest parts of the reaction cells 1a to 1c and alkali metal halides do not accumulate.

Exhaust from the housing chamber 2 is supplied through the exhaust line 13 to the dehydration unit 14. The dehydration unit 14 acts, for example, as a distillation column, in which a liquid containing an organic amide solvent as the main component is recovered from one end (the lower part, for example), and vapor containing the sulfur source, the dihalo aromatic compound, and water is recovered from the other end (the upper part, for example).

The organic amide solvent recovered from the dehydration unit 14 may be subjected, as appropriate, to refining, and the like, and then once again supplied to the housing chamber 2 as a raw material for the polymerization reaction. At that time, supply to the housing chamber 2 may be performed through the organic amide solvent supply line 4, or may be performed through an organic amide solvent supply line other than the organic amide solvent supply line 4. The supply destination may be any one of the reaction cells 1a to 1c, or may be a combination of two or more thereof.

The vapor recovered from the above-mentioned other end of the dehydration unit 14 is supplied through the vapor recovery line 16 to the gas-liquid separation unit 17. The gas-liquid separation unit 17 acts, for example, as a distillation column, in which a gas containing the sulfur source is recovered from one end (the upper part, for example), and a liquid containing the dihalo aromatic compound and water is recovered from the other end (the lower part, for example).

The gas recovered from the one end of the gas-liquid separation unit 17 is supplied through the gas recovery line 18 to the reaction raw material separation and recovery unit 19. The sulfur source is separated and recovered from the gas at the reaction raw material separation and recovery unit 19, and is sent through the reaction raw material resupply line 21 to the reaction raw material resupply unit 22. Meanwhile, the remaining gas is discarded as waste gas through the waste gas line 20.

At least a portion of the sulfur source separated and recovered by the reaction raw material separation and recovery unit 19 is resupplied to at least some of the reaction cells 1a to 1c by the reaction raw material resupply unit 22. At that time, the resupply to the reaction cell 1a may be performed through the sulfur source supply line 5, or may be performed through a sulfur source supply line other than the sulfur source supply line 5. Through resupplying at least a portion of the sulfur source, the sulfur source can be effectively used, and resource savings can be achieved.

The liquid recovered from the gas-liquid separation unit 17 is supplied through the liquid recovery line 23 to the reaction raw material separation and recovery unit 24. The dihalo aromatic compound is separated and recovered from the liquid at the reaction raw material separation and recovery unit 24, and is sent through the reaction raw material resupply line 26 to the reaction raw material resupply unit 27. Meanwhile, the remaining liquid is discarded as wastewater through the wastewater line 25.

At least a portion of the dihalo aromatic compound separated and recovered by the reaction raw material separation and recovery unit 24 is resupplied to at least some of the reaction cells 1a to 1c by the reaction raw material resupply unit 27. At that time, the resupply to the reaction cell 1a may be performed through the dihalo aromatic compound supply line 6, or may be performed through a dihalo aromatic compound supply line other than the dihalo aromatic compound supply line 6. Through resupplying at least a portion of the dihalo aromatic compound, the dihalo aromatic compound can be effectively used, and resource savings can be achieved.

As described above, the PAS continuous production device 100 does not require a plurality of polymerization vessels, and therefore piping between the plurality of polymerization vessels, as well as transfer equipment, instrumentation devices, and the like are not necessary. In addition, gravitational force is used for moving the reaction mixture based on the height differences of the maximum liquid surface levels, and the like, and therefore a significant amount of energy is not required to drive the PAS continuous production device 100. Hence, the PAS continuous production device 100 can easily enable resource savings, energy savings, reductions in equipment costs, and the like.

The PAS obtained according to the present embodiment is a linear or branched PAS, and is preferably polyphenylene sulfide (PPS).

The weight average molecular weight (Mw) of the PAS obtained by the present embodiment spans a wide range. Ordinarily, the lower limit value of the weight average molecular weight according to gel permeation chromatography (GPC) of the PAS obtained by the present embodiment is 2000 or greater, preferably 5000 or greater, and more preferably 6000 or greater. In addition, the upper limit value of this weight average molecular weight is 300000 or less, and preferably 100000 or less.

Embodiment 2

Figure 2:
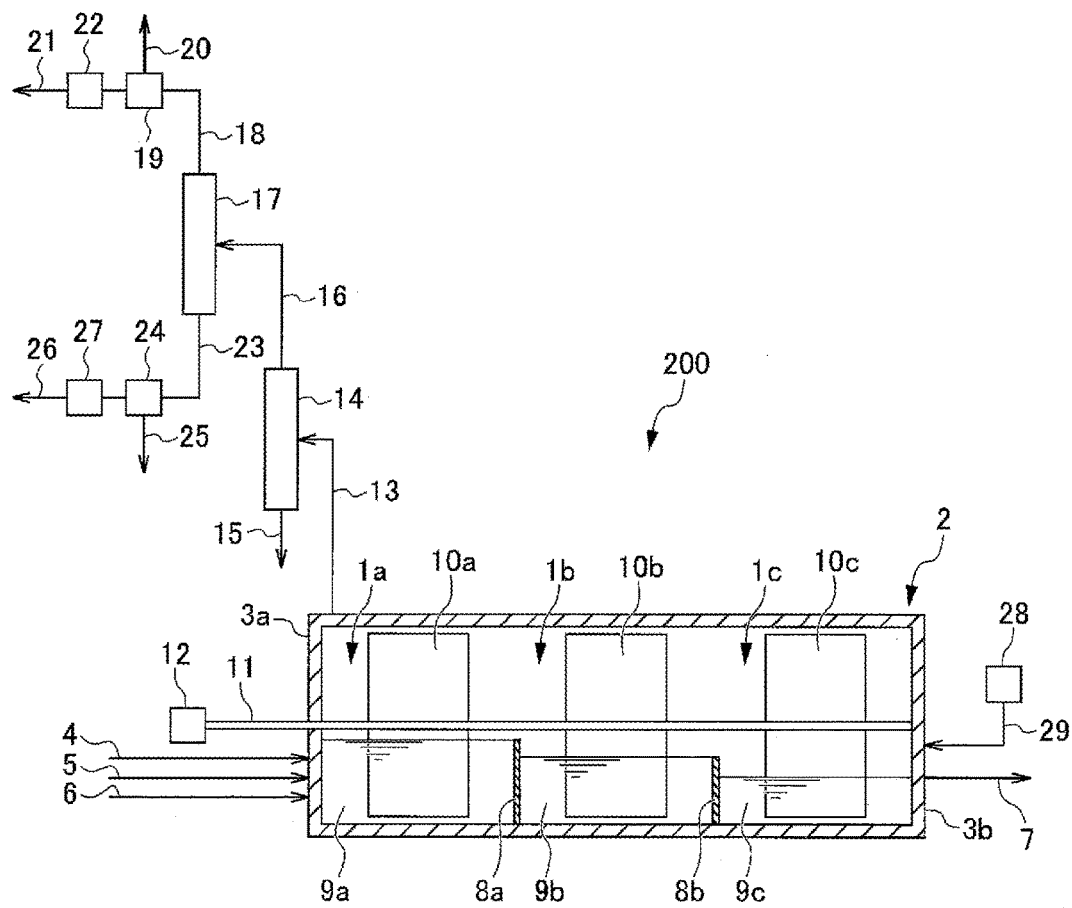
FIG. 2 is a partial cross-sectional view illustrating another embodiment of a PAS continuous production device according to the present invention.

FIG. 2 is a partial cross-sectional view illustrating another embodiment (hereinafter, referred to as "Embodiment 2") of a PAS continuous production device according to the present invention. The configuration and operation of Embodiment 2 are described below based on FIG. 2. Note that the raw materials used in Embodiment 1 can also be used in Embodiment 2.

A PAS continuous production device 200 according to Embodiment 2 is the same as the PAS continuous production device 100 according to Embodiment 1 with the exception that the housing chamber 2 is horizontally installed, the dimension of the partition wall 8*a* and the dimension of the partition wall 8*b* differ, and the connection position of a reaction mixture recovery line 7 at the side wall 3*b* differs.

When the bottom surface areas of the reaction cells 1*a* to 1*c* are the same, the PAS continuous production device 200 operates similarly to the PAS continuous production device 100 with the exception that the amount of reaction mixture that can be stored decreases in the order of the reaction cell 1*a*, the reaction cell 1*b*, and the reaction cell 1*c*.

With the PAS continuous production device 200, unlike the PAS continuous production device 100, the depths of each of the reaction cells 1*a* to 1*c* are nearly constant by location. Therefore, since alkali metal halides are easily accumulated over the entire bottom surface of each of the reaction cells 1*a* to 1*c*, ample stirring by the stirring blades 10*a* to 10*c* is particularly preferable. The width of the stirring blades 10*a* to 10*c* is preferably wide to ensure sufficient stirring by the stirring blades 10*a* to 10*c* so that alkali metal halides are not accumulated. For example, the width of the stirring blades 10*a* to 10*c* may be, with respect to the width of the reaction cells 1*a* to 1*c*, 50% or greater, preferably 60% or greater, more preferably 70% or greater, and even more preferably 80% or greater. Furthermore, all or some of the stirring blades 10*a* to 10*c* are preferably positioned at the center of each reaction cell from perspectives such as not easily producing a large bias in the stirring.

With respect to the present invention, cases were presented in which the stirring shaft 11 is a single shaft in the above-described Embodiments 1 and 2, but the present invention may also be configured with multiple shafts such as two or more shafts.

Moreover, with the present invention, only the removal of water may be performed at the reaction cell 1*a* described in the above-mentioned Embodiments 1 and 2.

Furthermore, the phrase "sequentially connected" used in the present specification preferably means that all are connected in a series, but some may be connected in parallel.

Summary

As described above, according to a first aspect of the present invention, a device for continuously producing poly (arylene sulfide) is provided, the device including a housing chamber configured to house a plurality of reaction cells, the housing chamber being supplied with at least: an organic amide solvent; at least one type of sulfur source selected from the group consisting of hydrogen sulfide, alkali metal sulfides, and alkali metal hydrosulfides; and a dihalo aromatic compound; a reaction mixture being formed by carrying out a polymerization reaction between the sulfur source and the dihalo aromatic compound in the organic amide solvent in at least one or more reaction cells, the reaction cells being mutually communicated through a gas phase in the housing chamber, and the reaction cells being sequentially connected, and the reaction mixture being sequentially moved to each of the reaction cells.

The above-described first aspect can also be expressed in the following manner. Namely, a device for continuously producing poly(arylene sulfide); the device including a housing chamber configured to house a plurality of reaction cells, the housing chamber being supplied with at least: an organic amide solvent; at least one type of sulfur source selected from the group consisting of alkali metal sulfides and alkali metal hydrosulfides; and a dihalo aromatic compound; a reaction mixture being formed by carrying out a polymerization reaction between the sulfur source and the dihalo aromatic compound in the organic amide solvent in the reaction cells, the reaction cells being mutually communicated through a gas phase within the housing chamber, and the reaction cells being connected in series, and the reaction mixture being sequentially moved to each of the reaction cells.

According to a second aspect of the present invention, with respect to the first aspect, at least one group or more with regard to combinations of adjacent reaction cells are connected in order from the highest maximum liquid surface level of liquid that can be accommodated by the reaction cells, and the reaction mixture may be moved by the difference in heights of the maximum liquid surface levels from a reaction cell with a higher maximum liquid surface level to a reaction cell with a lower maximum liquid surface level.

The above-described second aspect can also be expressed in the following manner. Namely, with respect to the first aspect, the reaction cells are connected in series in order from the highest maximum liquid surface level of liquid that can be accommodated by each of the reaction cells, and the reaction mixture may be sequentially moved in accordance with the order by the difference in heights of the maximum liquid surface levels from a reaction cell with a higher maximum liquid surface level to a reaction cell with a lower maximum liquid surface level.

According to a third aspect of the present invention, with respect to the first aspect, the reaction cells are connected in order from the highest maximum liquid surface level of liquid that can be accommodated by each of the reaction cells, and the reaction mixture may be sequentially moved in accordance with the order by the difference in heights of the maximum liquid surface levels from a reaction cell with a higher maximum liquid surface level to a reaction cell with a lower maximum liquid surface level.

According to a fourth aspect of the present invention, the reaction cells of any one of the first to third aspects may be connected in series.

According to a fifth aspect of the present invention, the device according to any one of the first to fourth aspects may further include stirring blades configured to stir the reaction mixture in the reaction cells.

According to a sixth aspect of the present invention, the stirring blades of the fifth aspect may be installed on the same stirring shaft.

According to a seventh aspect, reaction cells that are adjacent each other of the sixth aspect may be partitioned by a partition wall; and at each of the reaction cells with the exception of the furthest upstream reaction cell in the movement direction of the reaction mixture, a minimum height of the upstream side partition wall in the movement direction may be higher than the maximum liquid surface level of the reaction cell.

According an eighth aspect of the present invention, the device according to any one of the first to seventh aspects may further include a dehydration unit configured to communicate with the gas phase in the housing chamber to carry out dehydration from the gas phase.

According to a ninth aspect of the present invention, the device according to any one of the first to eighth aspects may further include a gas feeding unit configured to communicate with the gas phase in the housing chamber to feed inert gas to the gas phase from a downstream side towards an upstream side in the movement direction of the reaction mixture.

According to a tenth aspect of the present invention, the device according to any one of the first to ninth aspects may further include means for increasing the temperature of the reaction cells from the upstream side to the downstream side in the movement direction of the reaction mixture.

According to an eleventh aspect of the present invention, the device according to any one of the first to tenth aspects may further include: a reaction raw material separation and recovery unit configured to separate and recover, from the gas phase in the housing chamber, a portion of at least one type of reaction raw material selected from the group consisting of the sulfur source and the dihalo aromatic compound; and a reaction raw material resupply unit configured to resupply at least a portion of the separated and recovered reaction raw material to at least some of the reaction cells.

According to a twelfth aspect of the present invention, with regard to any one of the first to eleventh aspects, the polymerization reaction may be a reaction in which a prepolymer of the sulfur source and the dihalo aromatic compound are polymerized.

The above-described twelfth aspect can also be expressed in the following manner. Namely, with regard to any one of the first to eleventh aspects, the polymerization reaction may be a pre-polymerization reaction between the sulfur source and the dihalo aromatic compound.

According to a thirteenth aspect of the present invention, provided is a method for continuously producing poly (arylene sulfide) by carrying out simultaneously the steps of: supplying at least: an organic amide solvent; at least one type of sulfur source selected from the group consisting of hydrogen sulfide, alkali metal sulfides, and alkali metal hydrosulfides; and a dihalo aromatic compound to a housing chamber inside a device for continuously producing poly (arylene sulfide), the device including the housing chamber configured to house a plurality of sequentially connected reaction cells; forming a reaction mixture by carrying out a polymerization reaction between the sulfur source and the dihalo aromatic compound in the organic amide solvent in at least one or more reaction cells; removing from the housing chamber at least a portion of water inside the housing chamber through a gas phase in the housing chamber; and sequentially moving the reaction mixture to each of the reaction cells.

The above-described thirteenth aspect can also be expressed in the following manner. Namely, a method for continuously producing poly(arylene sulfide) by carrying out simultaneously the steps of: supplying at least: an organic amide solvent; at least one type of sulfur source selected from the group consisting of alkali metal sulfides and alkali metal hydrosulfides; and a dihalo aromatic compound to a housing chamber inside a device for continuously producing poly(arylene sulfide), the device including the housing chamber configured to house a plurality of connected reaction cells; forming a reaction mixture by carrying out a polymerization reaction between the sulfur source and the dihalo aromatic compound in the organic amide solvent in the reaction cells; removing from the housing chamber at least a portion of water inside the housing chamber through a gas phase in the housing chamber; and sequentially moving the reaction mixture to each of the reaction cells.

According to a fourteenth aspect of the present invention, with respect to the thirteenth aspect, at least one group or more with regard to combinations of adjacent reaction cells are sequentially connected in order from the highest maximum liquid surface level of liquid that can be accommodated by the reaction cells; and the reaction mixture may be moved by the difference in heights of the maximum liquid surface levels from a reaction cell with a higher maximum liquid surface level to a reaction cell with a lower maximum liquid surface level.

The fourteenth aspect of the present invention can also be expressed in the following manner. Namely, with respect to the thirteenth aspect, the reaction cells are connected in series in order from the highest maximum liquid surface level of liquid that can be accommodated by each of the reaction cells; and the reaction mixture may be sequentially moved in accordance with the order by the difference in heights of the maximum liquid surface levels from a reaction cell with a higher maximum liquid surface level to a reaction cell with a lower maximum liquid surface level.

According to a fifteenth aspect of the present invention, with respect to the thirteenth aspect, the reaction cells are sequentially connected in order from the highest maximum liquid surface level of liquid that can be accommodated by each of the reaction cells, and the reaction mixture may be sequentially moved in accordance with the order by the difference in heights of the maximum liquid surface levels from a reaction cell with a higher maximum liquid surface level to a reaction cell with a lower maximum liquid surface level.

According to a sixteenth aspect of the present invention, the reaction cells of any one of the thirteenth to fifteenth aspects may be connected in series.

According to a seventeenth aspect of the present invention, any one of the thirteenth to sixteenth aspects may further perform simultaneously a step of feeding an inert gas to the gas phase from a downstream side towards an upstream side in the movement direction of the reaction mixture.

According to an eighteenth aspect of the present invention, any one of the thirteenth to the seventeenth aspects may further perform simultaneously the steps of: separating and recovering, from the gas phase in the housing chamber, a portion of at least one type of reaction raw material selected from the group consisting of the sulfur source and the dihalo aromatic compound; and resupplying at least a portion of the separated and recovered reaction raw materials to at least some of the reaction cells.

EXAMPLES

Embodiments of the present invention will be described in further detail hereinafter using examples. The present invention is not limited to the examples below, and it is obvious that various aspects are possible with regard to the details thereof.

Method for Measuring Weight Average Molecular Weight:

The weight average molecular weight (Mw) of the polymer was measured under the following conditions using a high temperature gel permeation chromatograph (GPC) SSC-7101 available from Senshu Scientific, Co., Ltd. The weight average molecular weight was calculated as a polystyrene converted value.
Solvent: 1-chloronaphthalene,
Temperature: 210° C.,
Detector: UV detector (360 nm),
Sample injection amount: 200 μL (concentration: 0.05 mass %),
Flow rate: 0.7 mL/min,
Standard polystyrene: five types of standard polystyrenes of 616000, 113000, 26000, 8200, and 600.

Example 1

A PAS continuous production device that was the same as that illustrated in FIG. 1 with the exception of having six reaction cells formed by partitioning the housing chamber 2 with five partition walls was used. This PAS continuous production device was a reaction device made of Ti and having a dimension of 100 mm diameter×300 mm, and the partition walls were semi-circular. The above-mentioned PAS continuous production device was charged with 950 g of NMP, after which a temperature 1 of a portion delimited by the first and second partition walls from the upstream side was held at 180° C., and a temperature 2 of a portion delimited by the third and fourth partition walls was held at 240° C., and raw materials were continuously supplied from each supply line using metering pumps at flow rates of 4.61 g/min for a mixed solution of NMP-pDCB (NMP:pDCB (weight ratio)=1317.4:342), 0.51 g/min for 48 wt. % NaOH, and 0.76 g/min for 45 wt. % NaSH. At the same time, water was continuously removed from the PAS continuous production device using a distillation device connected to the PAS continuous production device while controlling the pressure to a gage pressure of 0.32 MPa through a pressure regulating valve, and the pDCB in the water that was removed was separated at a stationary tank and returned to the PAS continuous production device. In addition, the gas from the distillation device was passed through 2 kg of NMP at the downstream side of the pressure regulating valve, after which it was then passed through 5 kg of a 5 mass % sodium hydroxide aqueous solution to fully absorb and recover hydrogen sulfide, and the gas was then emitted. The polymerization reaction product was continuously caused to overflow from the reaction device, drawn out, and cooled.

The reaction product that was obtained after continuing the above-described operations for 5 hours was collected and analyzed. The reaction mixture that was caused to overflow from the reaction device was washed and filtered three times with acetone of the same weight and three times with water, and the obtained cake was dried under vacuum conditions at 80° C. for 8 hours, and thereby a PPS powder was obtained. The weight average molecular weight Mw obtained through GPC of this PPS powder was 7000.

Example 2

The same operations as those of Example 1 were carried out with the exception that the temperature 1 of the portion delimited by the first and second partition walls from the upstream side was held at 190° C. The weight average molecular weight Mw of the PAS obtained thereby was 10500.

REFERENCE SIGNS LIST 1a, 1b, 1c Reaction cell
2 Housing chamber
3a, 3b Side wall
4 Organic amide solvent supply line
5 Sulfur source supply line
6 Dihalo aromatic compound supply line
7 Reaction mixture recovery line
8a, 8b Partition wall
9a, 9b, 9c Reaction mixture
10a, 10b, 10c Stirring blade
11 Stirring shaft
12 Rotational driving device
13 Exhaust line
14 Dehydration unit
15 Organic amide solvent recovery line
16 Vapor recovery line
17 Gas-liquid separation unit
18 Gas recovery line
19, 24 Reaction raw material separation and recovery unit
20 Waste gas line
21, 26 Reaction raw material resupply line
22, 27 Reaction raw material resupply unit
23 Liquid recovery line
25 Wastewater line
28 Gas feeding unit
29 Gas feeding line
100, 200 PAS continuous production device
H Horizontal plane

The invention claimed is:
1. A method for continuously producing poly(arylene sulfide) by carrying out simultaneously the steps of:
supplying at least: an organic amide solvent; at least one type of sulfur source selected from the group consisting of hydrogen sulfide, alkali metal sulfides, and alkali metal hydrosulfides; and a dihalo aromatic compound to a housing chamber inside a device for continuously producing poly(arylene sulfide), the device comprising the housing chamber configured to house a plurality of sequentially connected reaction cells;
forming a reaction mixture by carrying out a polymerization reaction between the sulfur source and the dihalo aromatic compound in the organic amide solvent in at least one or more reaction cells;

removing from the housing chamber at least a portion of water inside the housing chamber through a gas phase in the housing chamber; and sequentially moving the reaction mixture to each of the reaction cells.

2. The method according to claim 1, wherein at least one group or more with regard to combinations of adjacent reaction cells are sequentially connected in order from the highest maximum liquid surface level of liquid that can be accommodated by the reaction cells, and the reaction mixture is moved by the difference in heights of the maximum liquid surface levels from a reaction cell with a higher maximum liquid surface level to the reaction cell with a lower maximum liquid surface level.

3. The method according to claim 1, wherein the reaction cells are sequentially connected in order from the highest maximum liquid surface level of liquid that can be accommodated by each of the reaction cells, and the reaction mixture is sequentially moved in accordance with the order by the difference in heights of the maximum liquid surface levels from a reaction cell with a higher maximum liquid surface level to a reaction cell with a lower maximum liquid surface level.

4. The method according to claim 1, wherein the reaction cells are connected in series.

5. The method according to claim 1, further implementing simultaneously a step of feeding inert gas to the gas phase from a downstream side to an upstream side in the movement direction of the reaction mixture.

6. The method according to claim 1, further implementing simultaneously the steps of:

separating and recovering, from the gas phase in the housing chamber, a portion of at least one type of reaction raw material selected from the group consisting of the sulfur source and the dihalo aromatic compounds; and resupplying at least a portion of the separated and recovered reaction raw material to at least some of the reaction cells.

\* \* \* \* \*